United States Patent [19]

Chester et al.

[11] 4,198,320

[45] Apr. 15, 1980

[54] CRACKING CATALYST WITH IMPROVED RESISTANCE TO POISONING BY METALS

[75] Inventors: Arthur W. Chester, Cherry Hill; William A. Stover, Woodbury, both of N.J.

[73] Assignee: Mobil Oil Corporation, New York, N.Y.

[21] Appl. No.: 950,635

[22] Filed: Oct. 12, 1978

Related U.S. Application Data

[63] Continuation of Ser. No. 769,244, Feb. 16, 1977, abandoned.

[51] Int. Cl.$^2$ ............................................. B01J 29/06
[52] U.S. Cl. ................................. 252/455 Z; 208/120
[58] Field of Search ....................... 252/455 R, 455 Z; 208/120

[56] References Cited

U.S. PATENT DOCUMENTS

| | | | |
|---|---|---|---|
| 3,140,249 | 7/1964 | Plank et al. | 252/455 Z |
| 3,260,681 | 7/1966 | Sanford et al. | 252/455 R |
| 3,598,759 | 8/1971 | Bertolacini | 252/455 R |

Primary Examiner—Carl F. Dees
Attorney, Agent, or Firm—Charles A. Huggett; Raymond W. Barclay; Howard M. Flournoy

[57] ABSTRACT

Amorphous (e.g., silica-alumina) and/or crystalline (e.g. aluminosilicate zeolite) cracking catalysts having improved resistance to metal poisoning are provided when colloidal dispersions, such as silica and/or alumina are added thereto.

12 Claims, No Drawings

CRACKING CATALYST WITH IMPROVED RESISTANCE TO POISONING BY METALS

This is a continuation of copending application Ser. No. 769,244, filed Feb. 16, 1977 and now abandoned.

BACKGROUND OF THE INVENTION

1. Field of the Invention

This application is directed to cracking catalysts having improved resistance to metal poisoning and to a method of preparing and using same.

2. Description of the Prior Art

The effects of metal poisoning on the cracking performance of amorphous catalysts have been extensively investigated (U.S. Pat. No. 3,234,119); however, only recently have the effects been detailed for zeolitic cracking catalysts. As a result of such studies, it is now known that contaminant coke and hydrogen yields (coke and hydrogen produced by the metal poisoning) are lower on zeolitic than amorphous catalysts, but that metal activity is deactivated more rapidly on amorphous catalysts (Cimbalo et al., Oil & Gas Journal, May, 1972, p. 112). Therefore, a number of methods have been proposed to overcome the problems associated with the cracking of metal-contaminated feedstocks. For instance, U.S. Pat. No. 3,944,482 proposes the cracking of high metals content feedstock in the presence of a catalyst comprising 1 to 40 wt. % of a zeolite, having cracking characteristics, dispersed in a refractory metal oxide matrix having a large pore size distribution (about 50–100 Å). Also, U.S. Pat. No. 3,711,422 proposes that metal poisoned cracking catalysts can be partially restored with antimony compounds and U.S. Pat. No. 3,977,963 proposes that the effects of metal poisoning can be negated with bismuth or manganese compounds.

U.S. Pat. Nos. 3,972,835; 3,957,689 and 3,867,308 advocate a cracking process utilizing a catalyst prepared from a silicate clay and zeolitic components, the patentees apparently neutralize silicates by adjusting their pH, and add clay and zeolites to the resulting solution to form cracking catalysts.

SUMMARY OF THE INVENTION

In accordance with the present invention, a colloidal dispersion of silica and/or alumina particles are added to a preformed catalyst or catalyst gel thereby producing novel catalysts of improved resistance to metal poisoning.

Metal poisoning of cracking catalysts occurs by contact of the circulating catalyst with metals contained in the charge stock. The primary effects of metal poisoning are increased hydrogen and coke yields and catalyst deactivation, all resulting in loss of both conversion and liquid product yields. The development of catalysts that show more resistance to metal poisoning is of considerable importance to current commercial cracking operations and in future applications to convert less desirable feedstocks containing high metal levels, e.g., residua or hydrotreated residua. The primary metal contaminants are nickel and vanadium, although other metals such as Fe, Cu and Mo contribute to a lesser extent.

This application is accordingly directed to the incorporation of colloidal dispersions of silica or alumina particles (sometimes referred to as "sols") in a cracking catalyst resulting in dramatic improvement in the resistance of the catalyst to poisoning by metals. The incorporation of the colloidal silica or alumina dispersions apparently reduce the contaminant hydrogen and coke yields when the catalyst is poisoned by metals; the lower hydrogen and coke yields effectively result in higher conversions and liquid product yields in commercial cracking units. The silica or alumina incorporation has no deleterious effects on the catalyst performance in the absence of metal poisons.

This application is further directed to cracking catalysts (e.g., amorphous silica-alumina and/or crystalline aluminosilicate zeolite containing) wherein the above advantages are achieved by having silica and/or alumina added thereto in the form of colloidal dispersions.

This application is more particularly directed to a process for preparing a cracking catalyst having the aforementioned improved characteristics of high resistance to metal poisoning, high attrition resistance and high selectivity when comprises preparing a cracking catalyst consisting of crystalline zeolitic and amorphous cracking catalysts and thereafter adding silica and/or alumina particles to said catalyst in the form of colloidal dispersions and to a method of using said catalyst in a process for the catalytic cracking of high metals content charge stock.

DESCRIPTION OF SPECIFIC EMBODIMENTS

The colloidal silica or alumina addition is applicable to any cracking catalyst, either amorphous (e.g., silica alumina) or crystalline (e.g. aluminosilicate zeolite-containing). The zeolite is usually contained in and distributed throughout an inorganic oxide gel matrix, as more particularly described in, for example, U.S. Pat. No. 3,140,249. The colloidal silica for alumina may be added at any point in the catalyst manufacturing process after gel formation. Any drying method may be used; spray drying, flash drying, oven or slow rotary drying. The silica or alumina can be added in the form or a dispersion of small particles in water or any other suitable solvent. The silica or alumina particles should be in the colloidal size range, i.e., the particle diameters can be from 10 to 10,000 Å. Suitable silica dispersions may be obtained from a variety of commercial sources or they may be prepared by appropriate chemical treatment of metal silicates. The amount of added silica and/or alumina sol is generally between about 0.1 and about 50 weight percent of the final catalyst and preferably from about 1 to 10 weight percent.

In addition, a colloidal silica and/or alumina dispersion can be added to an inventory catalyst during unit operation, for instance, in the feed or separate addition to the stripper, regenerator or catalyst standpipes (or a catalyst cooler if present). The silica or alumina initially may be in the form of a silicon or aluminum compound, such as organosilanes, silicones, organoaluminum compounds or aluminum alkoxides or a colloidal silica or alumina dispersion.

Suitable amorphous catalytic materials which may be advantageously used in the catalysts embodied herein include silica, alumina, magnesium, zirconia, boria, titania chromia and combinations thereof, combinations of inorganic oxide typified by silica-alumina, silica-zirconia, silica-boria, silica-magnesia, silica-titania or ternary combinations such as silica-alumina-zirconia, silica-alumina-magnesia, particularly with silica as silica-alumina and silica-magnesia-alumina.

Suitable zeolite catalytic material useful in the catalysts herein include X and Y aluminosilicate zeolites, ZSM-4, ZSM-5, ZSM-11, ZSM-12, ZSM-35, ZSM-38 and other similar materials, such as erionite, mordenite and faujasite.

EXAMPLE 1—Base Catalyst

A catalyst was prepared having the composition of 15% rare earth Y crystalline aluminosilicate zeolite (REY) and 85% matrix, the matrix being made up of 59.4% silica, 0.6% alumina and 40% clay.

A clay-water slurry was prepared by addition of 1600 grams (dry basis) WP Georgia kaolin to 89.5 lbs. of deionized (DI) water; 8250.7 grams of sodium silicate, containing 2376 grams $SiO_2$ was added with stirring. The mixture was heated to 120° F. and concentrated sulfuric acid (97% $H_2SO_4$) was added at a uniform rate while mixing to adjust the pH to 10.5. After cooling the mixture to ambient temperature, a 20% aqueous solution of aluminum sulfate was added at a uniform rate over a 30 minute period so as to provide a final alumina content of 0.6 wt.%, based on total dry matrix weight. The mixture was then adjusted to a pH of 4.5 by addition of concentrated sulfuric acid over a 30 minute period.

To the silica-alumina-clay slurry were added 705.9 grams of rare earth exchanged zeolite Y (REY) slurried in 2200 cubic centimeters of water. The REY had previously been 68% exchanged (i.e., 68% of the sodium content was replaced by rare earth cations) and pretempered by calcining at 1200° F. for about 10 minutes (the REY had the following composition: $Al_2O_3=21.7$, $SiO_2=61.4$, $RE_2O_3=15.9$, and $Na=3.2\%$ wt.). The REY-water slurry was homogenized in a blender prior to addition to the matrix slurry.

The catalyst hydrogel composite was then homogenized and spray dried with an air inlet temperature of 700° F. and outlet temperature of 350° F. The spray dried product was slurried with water and added to ion exchange columns, then base exchanged with 20 gallons of a 5% aqueous solution of ammonium sulfate. The base exchanged catalyst composite was washed substantially free of sulfate with DI water, then exchanged with rare earth chloride solution containing 175 grams $RECl_3.6H_2O$ as a 50% aqueous solution dissolved in 20 liters of DI water. The rare earth exchanged catalyst was then washed substantially free of chloride ion with DI water and dried at about 250° F. for about 40 hours.

The resultant catalyst had a sodium content of 0.03 wt % Na and a (water) pore volume of 0.73 cc/gram. The mean particle diameter was 58 microns.

EXAMPLE 2—Silica Sol Added Prior To Spray Drying

A catalyst was prepared in a substantially identical manner to that in Ex. 1, except that the initial matrix gel was perpared containing 5% less silica (i.e., 54.4% wt $SiO_2$) by adjusting the amount of sodium silicate. The remaining 5% $SiO_2$ was added to the catalyst hydrogel composite after addition of the REY and just prior to homogenization and spray drying. The added silica was in the form of a commercially prepared colloidal silica containing 30% wt $SiO_2$ and 0.1% Wt $Na_2O$ stabilizer with a silica particle size of about 17 millimicrons and surface area of about 195-215 $m^2/g$. The resultant catalyst had a sodium content of 0.06% wt Na and a water pore volume of 0.58 cc/gram; the mean particle diameter was 73 microns.

EXAMPLE 3—Silica Sol Added After Final Drying

A catalyst was prepared in a substantially identical manner to that in Ex. 1, except that the initial matrix gel was prepared containing 5% less silica (i.e., 54.4% wt $SiO_2$) by adjusting the amount of sodium silicate. The remaining 5% silica was added to the dried catalyst by impregnation with a solution of the commercial colloidal silica of Example 2 in sufficient deionized water to just fill the pores of the catalyst. The impregnated catalyst was dried at 250° F. for about 16 hours.

The resultant catalyst had a sodium content of 0.08 wt % Na and a pore volume of 0.59 cc/gram; the mean particle diameter was 67 microns.

EXAMPLE 4—Catalyst Tests

The catalysts of Examples 1, 2 and 3 were each steam treated in a fluidized bed for 4 hours at 1400° F. in flowing steam at atmospheric pressure. The steamed catalysts were tested for cracking activity and selectivity by cracking a wide-cut Mid-Continent gas oil at 920° F., 3 weights catalyst/oil and 8.33 weight-hourly space velocity in a fixed fluidized bed. The properties of the gas oil chargestock are listed in Table 2; the test results are given in Table 1. As is evident from the data, the replacement of some matrix silicate with silica in the form of a colloidal dispersion has only minor effects on cracking activity and selectivity. The higher gas yields with the catalysts of Examples 2 and 3 may be due to gasoline recracking (over-cracking) because of diffusion restrictions caused by the relatively large particle silica in the matrix.

TABLE 1

| | Product Distributors For Steamed Catalysts | | |
|---|---|---|---|
| Example No. | 1 | 2 | 3 |
| Description | Base Catalyst | $SiO_2$ Prior to S.D.* | $SiO_2$ Post, Final Drying |
| Conv. % Vol | 81.5 | 79.5 | 81.6 |
| C5+ Gasoline, % Vol | 65.6 | 63.2 | 65.2 |
| Total C4's | 17.4 | 18.4 | 18.6 |
| Dry Gas, % wt. | 7.3 | 7.7 | 8.1 |
| Coke, % wt. | 3.96 | 3.85 | 4.08 |
| $H_2$, % wt. | 0.02 | 0.02 | 0.02 |

Catalysts steamed 4 hours - 1400° F.
0 psig. 100% steam
Catalysts tested 920° F., 3 C/O. 8.3 WHSV. WCMCGO. fixed fluidized bed
*Spray drying

TABLE 2

| Properties of Wide-Cut Midcontinent Gas Oil (WCMCGO) | |
|---|---|
| API Gravity | 29.2 |
| Sulfur, % wt. | 0.51 |
| Nitrogen, % wt. | 0.065 |
| Basic Nitrogen, ppm | 152 |
| Conradson Carbon, % wt. | 0.29 |
| Aniline Point, °F. | 181 |
| Bromine Number | 2.5 |
| Refractive Index at 70° F. | 1.48852 |
| Pour Point, °F. | 85 |
| Viscosity, l.V at 210° F. | 3.55 |
| Molecular weight | 328 |
| Hydrogen, % wt. | 13.06 |
| Specific Gravity, 60/60° F. | 0.8767 |
| Metals: Ni, ppm | 0.1 |
| V, ppm | 0.2 |
| Fe, ppm | 32 |
| Distillation, °F.: | |
| IBP | 472 |
| 5% Vol | 545 |
| 10 | 578 |
| 20 | 608 |

TABLE 2-continued

| Properties of Wide-Cut Midcontinent Gas Oil (WCMCGO) | |
|---|---|
| 30 | 632 |
| 40 | 665 |
| 50 | 707 |
| 60 | 754 |
| 70 | 796 |
| 80 | 851 |
| 90 | 920 |
| 95 | 958 |

EXAMPLE 5—Metal Poisoning of Steamed Catalysts

In order to simulate the effects of metal poisoning, the catalysts of Examples 1, 2, and 3, after steaming as described in Example 4, were poisoned with nickel and vanadium as follows: A metal poisoned charge stock containing about 1700 ppm each Ni and V was prepared by dissolving nickel and vanadium naphthenates in WCMCGO. Five parts of steamed catalyst were impregnated with one part of the metal poisoned charge stock at ambient temperatures; the volume of the charge stock was adjusted with xylene such that the total volume just filled the catalyst pores. The excess xylene in the catalyst was subsequently evaporated at 250° F. The charge stock impregnated catalyst was then heated in a fixed fluidized bed in a stream of $N_2$ to 980° F. and maintained at that temperature for about 10 minutes. This procedure causes the charge stock to crack on the catalysts, depositing both metals and coke on the catalyst. The coke was subsequently removed by oxidation in air at 1200° F. The clean burnt metal poisoned catalysts, containing about 340 ppm each Ni and V were tested for cracking activity and selectivity as described in Example 4. The results are presented in Table 3.

The effects of metal poisoning on the base catalyst of Example 1 are readily apparent; the metal poisons reduce the cracking activity, produce much higher coke and hydrogen yields in spite of the lower conversion and, as a result, produce much less gasoline product. When the catalysts contain colloidal silica (Examples 2 and 3), the effects of the metals are considerably reduced: the loss of cracking activity is considerably reduced, as is the increased yield of both coke and hydrogen; as a result, a substantially higher gasoline yield results.

TABLE 3

| | 1 | 2 | 3 |
|---|---|---|---|
| Example Description | Base Catalyst | $SiO_2$ Prior to S.D. | $SiO_2$ Post S.D. |
| Conv., % vol | 74.5 | 78.6 | 79.1 |
| $C_5+$ Gaso., % vol | 57.0 | 60.6 | 60.9 |
| Total $C_4$'s | 14.4 | 15.0 | 15.4 |
| Dry Gas. %wt | 6.5 | 7.8 | 7.5 |
| Coke, % wt | 6.7 | 5.5 | 6.5 |
| $H_2$, % wt | 0.66 | 0.54 | 0.66 |

Product Distributions for Metal Poisoned Catalysts

Steamed catalysts poisoned with 340 ppm each Ni and V. Catalysts tested at 920° F., 3 C/O, 8.33 WHSV, WCMCGO, fixed fluid bed.

EXAMPLE 6—Addition of Collidal Silica and Colloidal Alumina to a Commercial Cracking Catalyst Colloidal silica was incorporated into a commercial zeolitic fluid cracking catalyst, designated Example 6A as follows: the fresh catalyst was impregnated at ambient temperatures with 2.5% wt $SiO_2$ in the form of a colloidal dispersion (Ex. 2) diluted with DI water to a sufficient volume to just fill the catalyst pores. The impregnated catalyst (Example 6B) was dried at 250° F. The same fresh catalyst was impregnated with 1.9 wt % $Al_2O_3$ in the form of a commercial colloidal dispersion of alumina (dispersed in 0.6% nitric acid, 4.8 millimicron particle diameter) and dried at 250° F. (Example 6C). The fresh catalyst and the silica- and alumina-treated catalysts were each steamed and tested for cracking activity and selectivity before and after metal poisoning as described in Examples 4 and 5. The results are given in Table 4. It is apparent that both the silica and alumina treated catalysts are more resistant to metal poisoning than the fresh catalyst in that they yield less coke and hydrogen, and more liquid product (gasoline and butanes) after metal poisoning than the base catalyst not treated with silica or alumina.

The fresh catalyst (Ex. 6A) had the following analyses: Na=0.19, $RE_2O_3$=3.04, $SiO_2$=64.4, $Al_2O_3$=26.7% wt. After calcination at 1200° F., its (water) pore volume was 0.48 cc/gm and its surface area was 253 $m^2$/gm.

Table 4

| Effect of Silica and Alumina Treatment | | | |
|---|---|---|---|
| Catalyst Ex. | 6A | 6B | 6C |
| A. After Steaming 4 hours-1400° F. F-0 psig, 100% steam | | | |
| Conv. % vol | 80.2 | 78.0 | 79.8 |
| $C_5+$ Gaso., % vol | 63.3 | 62.7 | 64.1 |
| Total $C_4$'s % vol | 18.3 | 16.6 | 16.8 |
| Dry Gas, % wt | 8.1 | 7.6 | 7.5 |
| Coke, % wt | 4.35 | 4.04 | 4.59 |
| $H_2$, % wt | 0.02 | 0.02 | 0.03 |
| B. After Poisoning steamed catalysts with 340 ppm each Ni and V | | | |
| Conv., % vol | 76.7 | 76.9 | 77.3 |
| $C_5+$ Gaso., % vol | 58.5 | 59.0 | 58.0 |
| Total $C_4$'s % vol | 15.5 | 16.0 | 17.4 |
| Dry Gas, % wt. | 8.0 | 7.8 | 8.3 |
| Coke, % wt | 6.82 | 5.96 | 6.41 |
| $H_2$, % wt | 0.50 | 0.40 | 0.47 |

Catalyst tested at 920° F., 3 C/O, 8.33 WHSV, WCMCGO, fixed fluidized bed.

EXAMPLE 7—Addition of Colloidal Silica to A Commercial Catalyst

Colloidal silica was incorporated into a commercial zeolitic catalyst, designated Example 7A. The fresh catalyst had the following analyses: Na=0.40% wt, $RE_2O_3$=3.49% wt, $Al_2O_3$=43.6% wt. After calcination at 1200° F., its pore volume was 0.45 cc/gm and its surface area was 118 $m^2$/gm. The amount of colloidal silica was 2.5% wt. $SiO_2$; the technique was the same as that used in Ex. 6. Both Example 7A and silica treated Example 7B were steamed and tested for cracking activity and selectivity before and after metal poisoning as described in Ex. 4 and 5. The results, given in Table 5, show that the catalyst is more metal resistant after incorporation of colloidal silica, in that it produces more gasoline and butane, as well as less hydrogen, than the fresh zeolitic catalyst itself after poisoning with Ni and V.

TABLE 5
Effect of Silica Treatment

| Catalyst Example | 7A | 7B |
|---|---|---|
| A. After steaming 4 hours-1400° F. - 0 psig, 100% steam | | |
| Conv., % vol. | 79.6 | 82.0 |
| $C_5+$ Gaso., % vol. | 64.3 | 66.3 |
| Total $C_4$'s % vol. | 17.2 | 17.0 |
| Dry Gas, % wt | 7.0 | 7.3 |
| Coke, % wt | 4.0 | 5.0 |
| $H_2$, % wt | 0.04 | 0.05 |
| B. After poisoning with 340 ppm each Ni and V | | |
| Conv., % vol | 73.3 | 76.9 |
| $C_5+$ Gaso., % vol. | 57.1 | 57.8 |
| Total $C_4$'s % vol. | 13.0 | 14.1 |
| Dry Gas, % wt | 6.2 | 7.3 |
| Coke, % wt | 6.9 | 7.8 |
| $H_2$, % wt | 0.80 | 0.74 |

Catalysts tested at 920° F., 3 C/O, 8.33 WHSV, WCMCGO, fixed fluidized bed.

EXAMPLE 8—Addition of a Mixture of Silica and Alumina

A mixture of colloidal silica and alumina was incorporated into a commercial zeolitic fluid cracking catalyst, Ex. 8A. The fresh catalyst had the composition Na, 0.26% wt; $RE_2O_3$, 2.65% wt; $SiO_2$, 66.7% wt; $Al_2O_3$, 22.6% wt; its pore volume and surface area after calcination at 1200° F. were 0.48 cc/gm and 261 m²/gm, respectively. The silica-alumina mixture was prepared by dispersing colloidal alumina (Ex. 6C) in 0.6% nitric acid, then adding the alumina dispersion to colloidal silica (Ex. 2) diluted to the appropriate volume. The ratio of alumina to silica in the mixture was 0.86:1 wt. The fresh catalyst was impregnated with this mixture such that it contained 4.64% wt of added $Al_2O_3+SiO_2$, then dried at 250° F. (Example 8B).

Both Example 8A and silica-alumina treated 8B were steamed and tested for cracking activity and selectivity before and after metal poisoning as described in Examples 4 and 5. The results are shown in Table 6. The silica-alumina treated catalyst produced significantly less coke than the untreated catalyst after metal poisoning. In commercial (heat balanced) operation, the lower coke yield would allow higher conversions and therefore higher liquid product yields to be obtained.

Table 6
Effect of Silica-Alumina Treatment

| Catalyst | Example 8A | Example 8B |
|---|---|---|
| A. After steaming 4 hours - 1400° F. - 0 psig, 100% steam | | |
| Conv, % vol. | 79.1 | 80.2 |
| $C_5+$ Gaso., vol. | 64.7 | 65.9 |
| Total $C_4$'s | 16.1 | 18.4 |
| Dry Gas, % wt. | 6.6 | 5.5 |
| Coke, % wt. | 3.75 | 3.49 |
| $H_2$, % wt. | 0.04 | 0.03 |
| B. AFter poisoning with 340 ppm each Ni and V | | |
| Conv., % vol. | 77.3 | 77.3 |
| $C_5+$ Gaso., vol. | 60.8 | 59.4 |
| Total $C_4$'s, vol. | 13.7 | 14.4 |
| Dry Gas, % wt. | 6.5 | 7.2 |
| Coke, % wt. | 6.98 | 6.38 |
| $H_2$, % wt. | 0.45 | 0.52 |

EXAMPLE 9—Effect of Silica in Chargestock

A fresh commercial zeolitic fluid cracking catalyst (9A) was steamed for 4 hours at 1400° F. at 0 psig, 100% steam in a fixed fluidized bed. The steamed catalyst was metal poisoned as in Example 5 with a metal poisoned chargestock containing 2200 ppm each Ni and V as naphthenates. In addition to the chargestock and xylene, various amounts of silica, in the form of an oil dispersion containing 57% wt $SiO_2$ as 20 millimicron diameter colloidal particles, were added simultaneously resulting in catalysts 9B and 9C. Catalyst 9B contains 0.1% wt added silica and catalyst 9C contains 0.5% wt added silica. The chargestock-silica-impregnated catalysts were then cracked, regenerated and tested as in Ex. 5. The results are shown in Table 7. The silica addition has resulted in a moderation of the metal poisoning effects.

Table 7
Effect of Silica in Chargestock

| Catalyst | Ex. 9A | Ex. 9B | Ex. 9C |
|---|---|---|---|
| $SiO_2$, % wt of catalyst | 0 | 0.1 | 0.5 |
| $SiO_2/(Ni + V)$, wt/wt | 0 | 1.1 | 5.7 |
| Conv., % vol. | 79.4 | 79.1 | 79.5 |
| $C_5+$ Gaso, % vol. | 62.8 | 62.9 | 63.4 |
| Total $C_4$'s, % vol. | 13.6 | 13.4 | 13.6 |
| Dry Gas, % wt. | 6.9 | 6.8 | 6.8 |
| Coke, % wt. | 6.2 | 5.9 | 5.9 |
| $H_2$, % wt. | 0.69 | 0.62 | 0.63 |

Catalyst tested at 920° F., 3 C/O, 8.33 WHSV, WCMCGO, fixed fluidized bed. Catalysts metal poisoned with 440 ppm each Ni and V.

The data detailed in the various tables above clearly substantiate that the added silica, alumina, or mixed silica-alumina can significantly decrease the hydrogen and coke yields caused by metal poisons, thereby resulting in higher liquid product yields. The "enriched" catalysts disclosed herein, resulting from the addition of colloidal silica and/or alumina particles to a pre-formed catalyst matrix therefore results in cracking catalysts of highly improved metal resistance.

The use of a metal resistant catalyst in current commercial operations can be quite beneficial. Typical fresh feeds contain as much as 1 ppm metals (Ni, V, Cu). The use of a catalyst such as described above can significantly reduce the additional coke and hydrogen yields caused by these metals, resulting in better liquid yields. Alternatively, the same yields could be attained with feeds of higher metal content, allowing a larger fraction of the total crude to be converted. In addition, such catalysts would allow improved processing of residua, which contain much higher metal levels.

Such variations and modifications as fall within the scope of the application and appended claims and as readily understood by one of ordinary skill in the art are included herein.

What is claimed is:

1. In the preparation of an inorganic oxide gel-containing cracking catalyst for converting hydrocarbons, the improvement which comprises incorporating into the catalyst subsequent to gel formation a colloidal dispersion of an oxide selected from silica, alumina or silica-alumina to deposit between about 0.1 and about 50 weight percent of said oxide therein, said colloidal dispersion having a particle size of from 10 to 10,000 Å and where said cracking catalyst has a crystalline aluminosilicate zeolite in finely divided form contained in and distributed throughout the inorganic gel matrix whereby the resulting catalyst composite is characterized by (1) a resistance to metal poisoning and (2) a reduction in contaminant hydrogen and coke yields greater than that of corresponding catalysts which have not undergone treatment with said colloidal dispersion.

2. The method of claim 1 wherein said colloidal dispersion is a silica sol.

3. The method of claim 1 wherein said colloidal dispersion is an alumina sol.

4. The method of claim 1 wherein said colloidal dispersion is a silica-alumina sol.

5. The method of claim 1 wherein the amount of deposited oxide is between about 1 and about 10 weight percent.

6. The method of claim 5 wherein said colloidal dispersion is a silica sol.

7. The method of claim 5 wherein said colloidal dispersion is an alumina sol.

8. The method of claim 5 wherein said colloidal dispersion is a silica-alumina sol.

9. The method of claim 5 wherein said crystalline aluminosilicate zeolite is zeolite X or zeolite Y.

10. The method of claim 1 wherein said cracking catalyst is in fluid form.

11. The method of claim 1 wherein said colloidal oxide dispersion is added to said catalyst after drying thereof.

12. The method of claim 1 wherein said colloidal oxide dispersion is added to said catalyst during use thereof in a catalytic cracking operation.

* * * * *